S. GOODFRIEND.
BREAD PAN.
APPLICATION FILED OCT. 15, 1917.

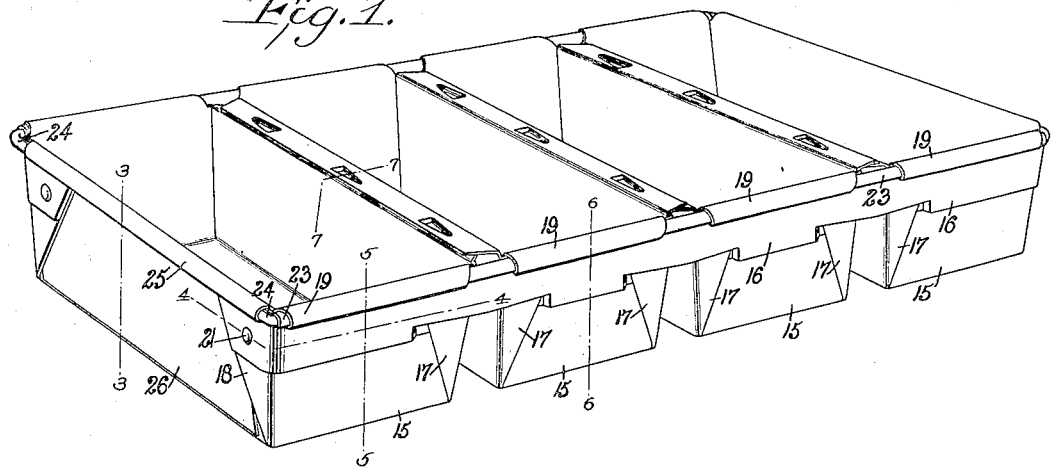
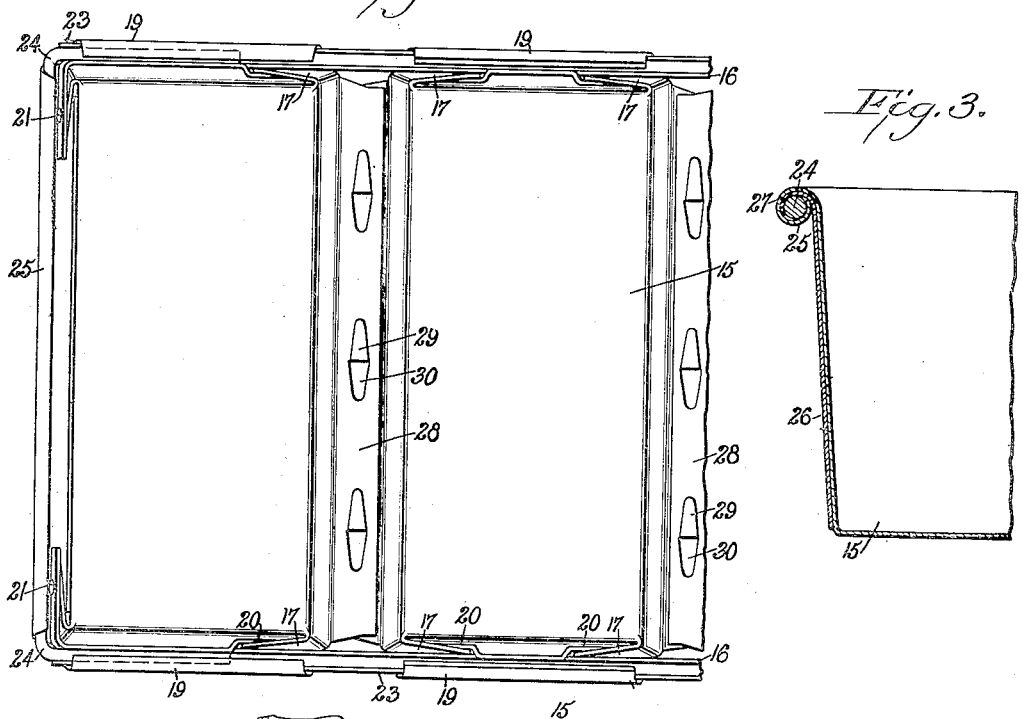
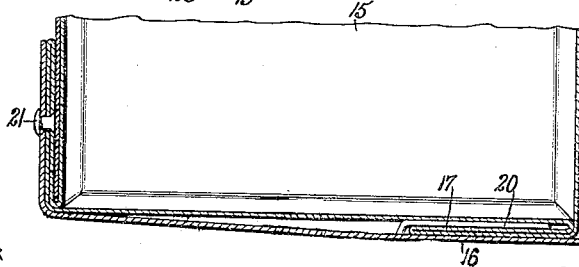

1,336,292.

Patented Apr. 6, 1920.
2 SHEETS—SHEET 2.

WITNESSES
Oliver W. Holmes
E. F. Murdock

INVENTOR
S. Goodfriend
BY
ATTORNEYS

UNITED STATES PATENT OFFICE.

SAMUEL GOODFRIEND, OF YONKERS, NEW YORK.

BREAD-PAN.

1,336,292.  Specification of Letters Patent.  Patented Apr. 6, 1920.

Application filed October 15, 1917. Serial No. 196,660.

*To all whom it may concern:*

Be it known that I, SAMUEL GOODFRIEND, a citizen of the United States, and a resident of Yonkers, in the county of Westchester and State of New York, have invented a new and Improved Bread-Pan, of which the following is a full, clear, and exact description.

Among the principal objects which the present invention has in view are: to form a rivetless utensil of the character mentioned; to unite for service a plurality of pans with a supporting structure inseparably mounted therein; to separably unite pans of the character mentioned and supporting side rails therefor; to prevent separation of said pans and the uniting structure therefor; and to provide the united pans with a small edge rim.

Drawings.

Figure 1 is a perspective view of a series of pans constructed and arranged in accordance with the present invention;

Fig. 2 is a bottom plan view on an enlarged scale showing two of said pans and means for uniting the same;

Fig. 3 is a cross section on an enlarged scale, the section being taken as on the line 3—3 in Fig. 1;

Fig. 4 is a horizontal section on an enlarged scale, the section being taken as on the line 4—4 in Fig. 1;

Description.

Figure 5:
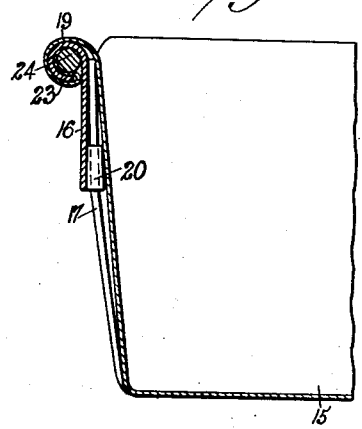
Fig. 5 is a vertical section shown on an enlarged scale, the section being taken as on the line 5—5 in Fig. 1.
Figure 7:
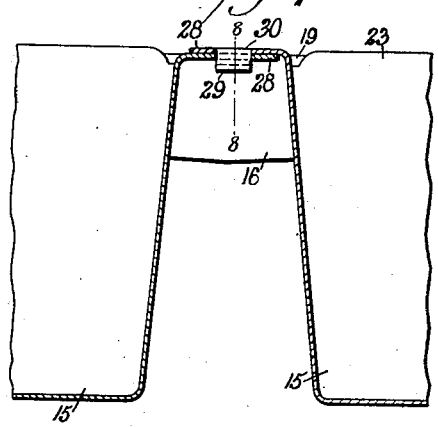
Fig. 7 is a longitudinal section, the section being taken as on the line 7—7 in Fig. 1.
Figure 6:
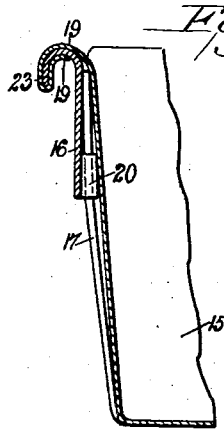
Fig. 6 is a similar section, the section being taken as on the line 6—6 in Fig. 1.
Figure 8:
Fig. 8 is a vertical section on an enlarged scale, the section being taken as on the line 8—8 in Fig. 7.

As seen in the drawings, a series of pans 15 are united in series by side bars 16. The pans 15 are so constructed as to avoid the presence of rivets at the interior of the pans. The pans are constructed from sheet metal, the sides being upturned for forming lapped corner sections 17 and lapped end corner sections 18. As seen best in Fig. 1 of the drawings, the sections 17 are folded over the ends of the pans 15 to form an upwardly-converging space terminating, as shown in Figs. 5 and 6, adjacent the rolled or curled edge extensions 19 of each pan. Between the end panels of each pan and the folded sections 17, are formed pockets, wherein extend fingers 20, as best seen in Figs. 2 and 4. An attachment between the side supporting bars 16 and the pans 15 is thus formed which endures unless the bars 16 are permitted to drop or move toward the bottom of the pans.

The bars 16 are supported in their service positions by rivets 21, driven through the bent ends of the said bars and the lapped end sections 18, which are turned upon the long and exposed sides of the end pans as seen best in Figs. 1 and 2.

Each individual pan is prevented from independent lift thereof with the corresponding separation of the pan and side bars, by the rolled or curled edge extensions 19. The extensions 19, as shown best in Fig. 6 of the drawings, are turned under the overturned curled edges 23 of the side bars 16. The extremes of the rolled extensions 19 are placed inside the valley formed by the edges 23 and the bodies of the bars 16.

Before the edges 23 are inturned against the bodies of the bars 16 to the shape shown in Fig. 5 of the drawings, the terminals of the end angle wires 24 are placed between the edges 23 and extensions 19 and the bodies of the bars at the ends of said bars. When in this position, the edges of the said bars and pans are contracted tightly on the angle wires 24. The wires 24 are preliminarily secured to the long sides of the pans 15 situated at the ends of the group. Said wires are secured by turning the edges 25 over and completely under the said wires, as is shown best in Fig. 3 of the drawings. The exposed sides of the end pans are each provided with a shield plate 26. The plates 26 are curled at the upper edge to form the overturned edge 27, likewise best shown in Fig. 3 of the drawings.

The pans 15 are provided with flat marginal edges 28. The edges 28 are secured by punching tabs 29, and overturning the same at the under sides of the lapped marginal edges. The openings 30 from which the tabs are punched, form ventilating spaces or permit the escape of heat from between the adjacent sides of the different pans.

Figure 9:
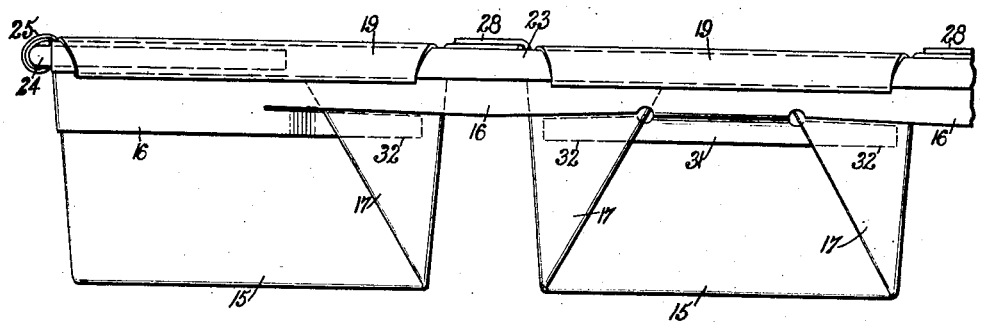
Fig. 9 is a side view of two end pans of the construction, the method of uniting the same shown therein being in accordance with the modified form of the invention.

In Fig. 9 of the drawings, a modification in the construction of the side bars 16 is shown, the modification consisting in pressing inward sections 31. The terminals 32 of the sections 31 are inserted between the lapped sections 17 of the pans to afford support therefor and to hold the bars 16 rigidly on the said pans.

As will be clear from Figs. 5 and 6, the described construction produces, in effect, unitary three-ply returned members formed jointly by the returned members 23 of each bar 16 and the returned members 19 on the pan disposed against the members 23 at the inner and outer surfaces thereof, so that a strengthening edge is provided which may be employed alone as in Fig. 6, or which is effectively employed with a wire 24 constituting a core as in Fig. 5 in which terminal returned edges of the pan members are located between the core and the returned bar member to lie laterally outward of the core and laterally inward of the returned member on the bar.

I would state in conclusion that while the illustrated examples constitute practical embodiments of my invention, I do not limit myself strictly to the mechanical details herein illustrated, since manifestly the same can be considerably varied without departure from the spirit of the invention as defined in the appended claims.

I claim:

1. A structure of the class described including supporting bars and a pan hung on said supporting bars, the supporting bars presenting turned-over members and the said pan likewise presenting members turned about the members on the respective bars and terminating within the latter and lying against the same to constitute with said bar members multi-ply composite unitary members, so that the terminal portions of the members on the pan lie between the body of the bar and the turned over member thereof.

2. A structure of the class described including supporting means, and a pan held within said supporting means, said supporting means and said pan presenting members at the top thereof rolled into interlocked engagement; the members presented by said pan being returned about the adjacent members of the supporting means together with a core within said rolled composite members, said core being adjacent to and outside of the returned member of the pan so that the said returned edge portions of the pan members are located respectively between the cores and the returned portions of the bar members to lie disposed laterally outward of the core and inward of the returned bar portions.

3. A bread-pan comprising a plurality of sheet-metal receptacles, each having curled edge extensions; a plurality of metal supporting bars, said bars having curled upper edges, said edges being folded within the first-mentioned edges of said pans to clamp rigidly said edges of said pans; and means for holding said bars in service relation to said receptacles, said means embodying longitudinal extensions partially severed from said bars for engaging said receptacles.

4. A bread-pan comprising a plurality of sheet-metal receptacles, each having curled edge extensions; a plurality of metal supporting bars, said bars having curled upper edges, said edges being folded within the first-mentioned edges of said pans to clamp rigidly said edges of said pans; means for holding said bars in service relation to said receptacles, said means embodying longitudinal extensions partially severed from said bars for engaging said receptacles; and means incorporated in said receptacles for engaging said extensions.

5. A bread-pan comprising a plurality of sheet-metal receptacles, each having curled edge extensions; a plurality of metal supporting bars, said bars having curled upper edges, said edges being folded within the first-mentioned edges of said pans to clamp rigidly said edges of said pans; means for holding said bars in service relation to said receptacles, said means embodying longitudinal extensions partially severed from said bars for engaging said receptacles; and means incorporated in said receptacles for engaging said extensions, said means embodying folded portions of the walls of said receptacles.

6. A bread-pan comprising a plurality of sheet-metal receptacles, each having curled edge extensions; a plurality of metal supporting bars, said bars having curled upper edges, said edges being folded within the first-mentioned edges of said pans to clamp rigidly said edges of said pans; means for holding said bars in service relation to said receptacles, said means embodying longitudinal extensions partially severed from said bars for engaging said receptacles; means incorporated in said receptacles for engaging said extensions, said means embodying folded portions of construction of said receptacles, said folded portions being lapped upon the exposed ends of said receptacles.

7. A bread-pan comprising a plurality of top-opening receptacles having laterally extended margins; a plurality of rigid supporting bars for said receptacles, said bars having curled upper edges; a plurality of reinforcing angle wires, each of said wires being structurally connected with the terminal units of said receptacles and adapted for engagement by said supporting bars;

and means for structurally connecting said receptacles and said supporting bars, said means embodying said margins of said receptacles infolding the curled edges of said bars, said margins being clamped between the edges of said bars and the body of said bars.

8. A bread-pan comprising a plurality of top-opening receptacles having laterally extended margins; a plurality of rigid supporting bars for said receptacles, said bars having curled upper edges; a plurality of reinforcing angle wires, each of said wires being structurally connected with the terminal units of said receptacles and adapted for engagement by said supporting bars; means for structurally connecting said receptacles and said supporting bars, said means embodying said margins of said receptacles infolding the curled edges of said bars, said margins being clamped between the edges of said bars and the body of said bars; and means for holding said reinforcing wires in structural relation to said bars, said means embodying the margins of said receptacles and the curled edge of said bars, said margins being folded within said bars to rest between said bars and said wires when said bars are clamped rigidly on said wires.

9. A structure of the class described including supporting means, and a pan held within said supporting means, said supporting means and said pan presenting members at the top thereof rolled into interlocked engagement; together with a wire constituting a core for the turned over members of the bars and pan, about which core said turned over members are rolled, the terminal portions of the turned over members of the pan being clamped between the said core and the turned over members of the supporting bars.

10. A bread-pan comprising a supporting bar having a curled edge; a plurality of receptacles having marginal extensions, said extensions being folded about said edge to be held thereby when the curled edge is closed on the body of said bar; and means for holding said bar and said receptacles in service relation, said means embodying a plurality of lapped structural extensions of said receptacles and partially severed integral extensions of said bars, the extensions of said bars entering between the extensions of said bars and the bodies of said receptacles.

11. A bread pan comprising a plurality of receptacles serially disposed; a plurality of supporting side bars for the same, said side bars having ends bent perpendicularly to the body thereof; a plurality of lapped sections attached to the end receptacles of said series; and means for permanently attaching the lapped sections and the bent ends of said bars for supporting said bars, said means embodying rivets extending through said lapped sections, and said ends, said rivets being arranged to avoid exposing any part thereof to the contents of the receptacles.

12. A bread pan comprising a plurality of top-opening receptacles, the angles of said receptacles being formed by lapped corner sections, said lapped sections being folded upon the sides of said receptacles, the lapped sections of the end receptacles at the exposed side thereof being folded upon the same side; means for uniting said receptacles, said means embodying a plurality of supporting bars united to ends of said receptacles, said bars having rigid overturned ends permanently attached to said lapped sections of the end receptacles.

13. A bread pan comprising a plurality of top-opening receptacles, the angles of said receptacles being formed by lapped corner sections, said lapped sections being folded upon the sides of said receptacles, the lapped sections of the end receptacles at the exposed side thereof being folded upon the same side, means for uniting said receptacles, said means embodying a plurality of supporting bars united to ends of said receptacles, said bars having rigid overturned ends permanently attached to said lapped sections of the end receptacles, and rivets extended through said lapped sections and said overturned ends for holding the same in service relation.

SAMUEL GOODFRIEND.